(No Model.)
W. S. HARRIS.
SINGLETREE.
No. 386,707. Patented July 24, 1888.
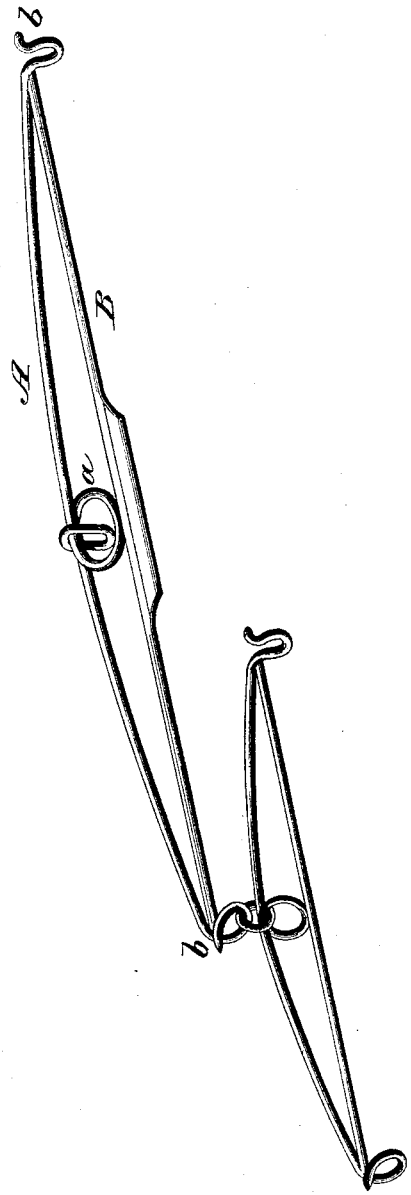
WITNESSES.
G. S. Elliott.
Wm Brown.
INVENTOR.
William S. Harris.
per Chas. H. Fowler
Attorney.

UNITED STATES PATENT OFFICE.

WILLIAM S. HARRIS, OF BARDWELL, KENTUCKY.

SINGLETREE.

SPECIFICATION forming part of Letters Patent No. 386,707, dated July 24, 1888.

Application filed April 19, 1888. Serial No. 271,160. (No model.)

*To all whom it may concern:*

Be it known that I, WILLIAM S. HARRIS, a citizen of the United States, residing at Bardwell, in the county of Carlisle and State of Kentucky, have invented certain new and useful Improvements in Single or Double Trees; and I do hereby declare that the following is a full, clear, and exact description of the same, reference being had to the annexed drawing, making a part of this specification, and to the letters and figures of reference marked thereon.

The present invention has for its object to provide a strong, durable, and practical single or double tree, and one that will possess sufficient strength to resist any undue strain upon it and be simple in construction and dispense with the usual clips and clevises heretofore employed.

The above objects I attain by the construction substantially as shown in the drawing and hereinafter described and claimed.

In the accompanying drawing, which represents a perspective view of my invention, A B designate the two wires from which the single or double tree is constructed. These wires are of sufficient thickness to possess the necessary strength for the purpose intended, the wire A being disposed on a curve, as shown, and at its center bent to form a loop, $a$, to serve as a brace to strengthen the single or double tree at or near its center. The wire at its extremities is bent to form hooks $b$, and the wire A is welded or otherwise secured to the wire B, thereby making a very strong and light device, the looped brace $a$ preventing the wires from springing. The doubletrees may be connected to the hooks $b$ by rings, as shown, or by any other well-known means found best adapted to the purpose, and rings or other devices may be employed to connect the singletree.

Having now fully described my invention, what I claim as new, and desire to secure by Letters Patent, is—

A single or double tree formed of two wires connected together, as described, one of said wires bent to form hooks at its extremities, and at or near its center bent to form a looped brace, substantially as and for the purpose set forth.

In testimony that I claim the above I have hereunto subscribed my name in the presence of two witnesses.

WILLIAM S. HARRIS.

Witnesses:
S. W. HICKS,
GEO. T. DUDLEY.